United States Patent [19]

Kasahara et al.

[11] Patent Number: 5,116,569
[45] Date of Patent: May 26, 1992

[54] AUSTENITIC STEEL EXCELLENT IN RESISTANCE TO NEUTRON IRRADIATION EMBRITTLEMENT AND MEMBERS MADE OF THE STEEL

[75] Inventors: Shigeki Kasahara, Hitachi; Kiyotomo Nakata, Katsuta; Jiro Kuniya, Hitachi; Shigeo Hattori, Ibaraki, all of Japan

[73] Assignee: Hitachi, Ltd., Tokyo, Japan

[21] Appl. No.: 563,697

[22] Filed: Aug. 7, 1990

[30] Foreign Application Priority Data

Aug. 11, 1989 [JP] Japan ................................. 1-206799

[51] Int. Cl.5 ............................................. C22C 38/58
[52] U.S. Cl. .................................. 420/44; 148/327; 376/339; 376/900
[58] Field of Search ................ 148/327; 376/339, 900; 420/44

[56] References Cited

U.S. PATENT DOCUMENTS

| 326 | 9/1987 | Brager et al. ........................ 376/900 |
| 4,302,247 | 11/1981 | Abe et al. ............................. 420/44 |

FOREIGN PATENT DOCUMENTS

| 0106426 | 4/1984 | European Pat. Off. . |
| 0142015 | 5/1985 | European Pat. Off. . |
| 0342574 | 11/1989 | European Pat. Off. . |
| 1194587 | 6/1965 | Fed. Rep. of Germany . |
| 3729577 | 9/1988 | Fed. Rep. of Germany . |
| 2483467 | 4/1981 | France . |
| 58-177439 | 10/1983 | Japan .................................. 148/327 |
| 59-222562 | 12/1984 | Japan .................................... 420/44 |
| 59-222563 | 12/1984 | Japan .................................... 420/44 |

OTHER PUBLICATIONS

Japanese Patent Examined Publication No. 1-18143.
Japanese Patent Unexamined Publication No. 62-238355.
Japanese Patent Unexamined Publication No. 62-238353.
Japanese Patent Unexamined Publication No. 62-107047.

Primary Examiner—Deborah Yee
Attorney, Agent, or Firm—Antonelli, Terry, Stout & Kraus

[57] ABSTRACT

An austenitic steel excellent in resistance to neutron irradiation embrittlement which contains, by weight, not more than 0.03% carbon, not more than 1% silicon, 5 to 25% manganese, 15 to 26% chromium, and 10 to 20% nickel, the ratio of atomic volume of chromium to the average atomic volume of matrix of the steel being from 0.900 to 1.030. It is possible to add to the austenitic steel, besides the above-mentioned alloying elements, at least one element selected from the group consisting of niobium, titanium, zirconium, tantalum and vanadium which are effective in corrosion resistance and irradiation embrittlement under neutron irradiation in total amounts of not more than 1.0%. At least one of components composing the inside of a nuclear reactor or nuclear fusion reactor is made of the austenitic steel.

14 Claims, 4 Drawing Sheets

AUSTENITIC STEEL EXCELLENT IN RESISTANCE TO NEUTRON IRRADIATION EMBRITTLEMENT AND MEMBERS MADE OF THE STEEL

BACKGROUND OF THE PRESENT INVENTION

This invention relates to members made of a new austenitic steel which are irradiated with radio-active rays and are in contact with high-temperature, high-pressure water and, more particularly, to an austenitic steel which is advantageous especially in intergranular corrosion resistance and new nuclear reactors and nuclear fusion reactors made of this steel.

At present, structural members irradiated with neutrons in the core of a light-water nuclear reactor are made of the stainless steels SUS 304 and 316 specified in JIS. The chromium contained in stainless steels contributes to the improvement in intergranular corrosion resistance. However, neutron irradiation at high temperatures forms layers deficient in chromium near the grain boundaries; this results in the formation of what is called a sensitized structure, which increases sensitivity to intergranular corrosion or boundary-type stress corrosion cracking. Methods for reducing or preventing intergranular corrosion and boundary-type stress corrosion cracking (hereinafter collectively referred to as intergranular corrosion) in steel by improving the properties of austenitic stainless steels, are disclosed in Japanese Patent Examined Publication No. 1-18143, Japanese Patent Unexamined Patent Publication Nos. 62-238355 and 62-238353. These methods involve reducing the carbon contained in stainless steels and adding carbide stabilizing elements, such as niobium and titanium, to prevent the precipitation of chromium carbides.

The above-mentioned conventional arts were developed to suppress the formation of layers deficient in chromium near grain boundaries (what is called the sensitized structure), which is caused by the precipitation of chromium carbides, and to improve intergranular corrosion resistance thereby. In particular, these techniques are intended for stainless steels used in structural members of a core of a nuclear reactor and the first wall of a nuclear fusion reactor.

However, it has become evident that when stainless steels which have undergone solution treatment are irradiated with neutrons, layers deficient in chromium are formed near the grain boundaries along with the knocking-out of atoms from the base metal. Layers deficient in chromium are formed by neutron irradiation according to the following mechanism:

(1) Atoms of the base metal are knocked out into steel by neutron irradiation, and pairs of an interstitial atom and a vacancy are formed.

(2) Both the interstitial atom and the vacancy move through the steel. During this movement, they join a solute atom, causing selective diffusion of the solute atom.

(3) In the stainless steels of JIS SUS 304 and 316, neutron irradiation causes chromium to move away from grain boundaries, generating layers deficient in chromium at grain boundaries.

Further, the improvement of corrosion resistance of the JIS SUS 304 stainless steel for structural members of the core of a nuclear reactor is disclosed in Japanese Patent Unexamined Publication No. 62-107047 as follows:

(1) Neutron irradiation causes silicon and phosphorus to segregate at grain boundaries, reducing corrosion resistance.

(2) Neutron irradiation forms chromium carbides near grain boundaries, sensitizing the structure.

To prevent these phenomena, the following are disclosed in the above patent publication:

1) The silicon and phosphorus contents are lowered.

2) The formation of chromium carbides is suppressed by adding elements that form stable carbides, such as molybdenum, niobium and titanium.

It is, however, impossible to prevent the above-mentioned decrease in intergranular corrosion resistance caused by sensitization due to layers deficient in chromium formed by neutron irradiation, only by controlling concentrations of impurities.

In the above conventional techniques, consideration is not given to the phenomenon that layers deficient in chromium are formed at grain boundaries due to the knocking-out and diffusion of chromium by neutron irradiation, and corrosion resistance in water at high temperatures poses a problem.

SUMMARY OF THE INVENTION

Accordingly, it is an object of the present invention to provide an austenitic steel that is excellent in neutron irradiation resistance.

It is another object of the present invention to provide an austenitic steel used under neutron irradiation in which manganese, chromium and nickel contents are adjusted so that chromium content at grain boundaries is not virtually below chromium content of matrix due to neutron irradiation.

It is still another object of the present invention to provide structures and devices in the core of a light-water nuclear reactor, heavy-water nuclear reactor and nuclear fusion reactor made of an austenitic iron-base alloy which is excellent in stress corrosion cracking resistance in an environment irradiated with not less than $10^{19}$ n/cm$^2$ of fast neutrons or equivalent corpuscular beams and in contact with high-temperature water.

According to one feature of the present invention, there is provided an austenitic steel excellent in resistance to neutron irradiation embrittlement which contains, by weight, not more than 0.03% carbon, not more than 1% silicon, 5 to 25% manganese, 15 to 26% chromium, and 10 to 20% nickel, and the ratio of atomic volume of chromium to the average atomic volume of matrix of the steel is from 0.900 to 1.030.

According to another feature of the present invention, there is provided an austenitic steel which contains, by weight, not more than 0.03% carbon, not more than 1% silicon, 7 to 25% manganese, 15 to 26% chromium, and 10 to 20% nickel.

It is possible to add to these steels one or more elements selected from the group consisting of niobium, titanium, tantalum, hafnium, vanadium and zirconium in total amounts of not more than 1.0%.

According to still another feature of the present invention, there is provided an austenitic steel with whole austenite microstructure which contains not more than 0.03% by weight carbon and desired amounts of manganese, nickel and chromium, and this steel contains the above manganese, nickel and chromium so that chromium content at grain boundaries is virtually not less than chromium content of matrix when the steel is irradiated at 500° C. with 1 MeV electron beams in an amount corresponding to $5 \times 10^{22}$ n/cm$^2$ in terms of quantity of neutron irradiation.

According to a further feature of the present invention, there is provided an austenitic steel with whole austenite microstructure which contains not more than 0.03 wt. % carbon and desired amounts of manganese, nickel and chromium, and the area ratio of intergranular fracture of this steel is not more than 15% when the steel is irradiated at 500° C. with 1 MeV electron beams in an amount corresponding to $5 \times 10^{22}$ n/cm$^2$ in terms of quantity of neutron irradiation, and is subjected to tensile test at room temperature at a strain rate of $3 \times 10^{-7}$/sec.

According to a still further feature of the present invention, in a nuclear reactor having a pressure vessel with a neutron source pipe, a core support plate, a neutron counter, a control-rod insertion pipe, a shroud, an upper lattice plate, and a clad pipe and a channel box for a fuel assembly, at least one of the above components of the nuclear reactor is made of the above-mentioned austenitic steel of the present invention, and at least one component selected from among the neutron source pipe, core support plate, neutron counter, control-rod insertion pipe, shroud, upper lattice plate, fuel-assembly clad pipe and channel box is further made of the above-mentioned austenitic steel of the present invention.

According to an additional feature of the present invention, in a nuclear fusion reactor comprising a divertor provided with ceramic tiles on a plasma side and having a water-cooled construction and the first wall provided with ceramic tiles on a plasma side and having a water-cooled construction in a vacuum vessel having a water-cooled construction, at least one of the above-mentioned components of the nuclear fusion reactor is made of the above-mentioned austenitic steel, and at least one of the components selected from among the vacuum vessel having a water-cooled construction, the divertor provided with ceramic tiles and having the water-cooled construction, and the first wall provided with ceramic tiles and having a water-cooled construction is further made of the above-mentioned austenitic steel.

DETAILED DESCRIPTION OF THE DRAWINGS

Figure 1:
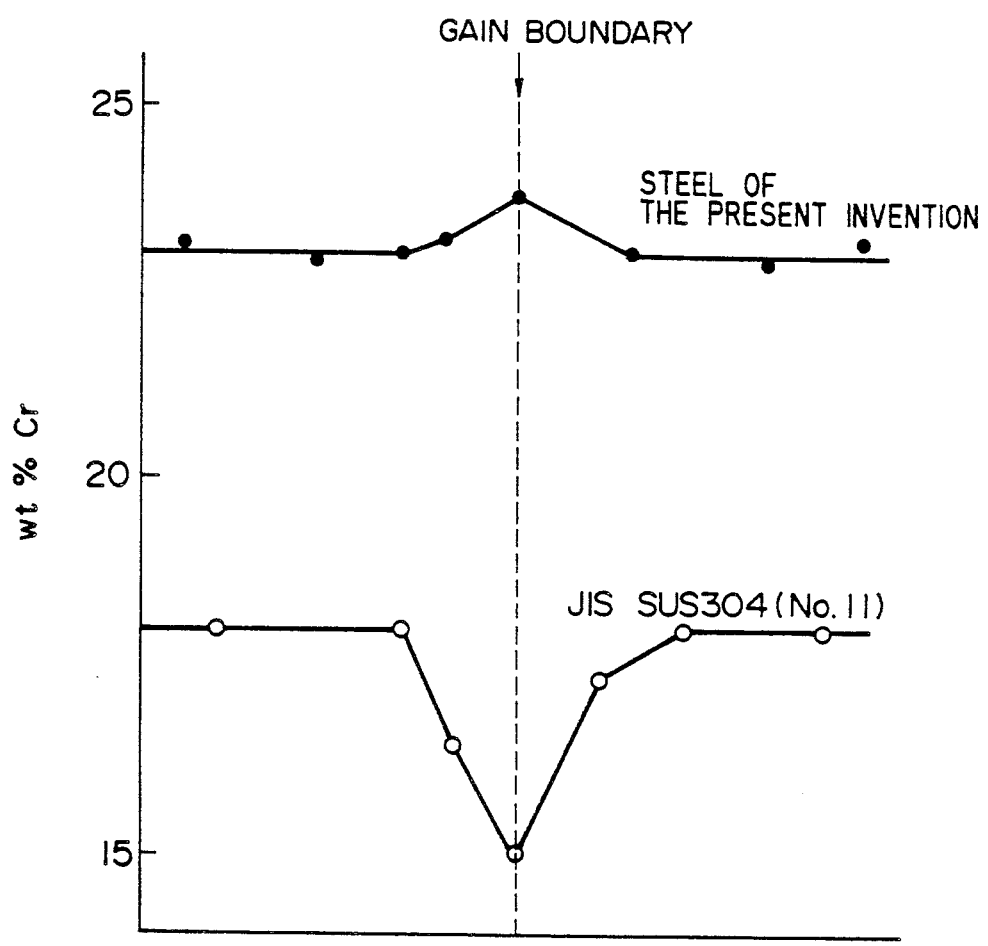
FIG. 1 is a graph showing the chromium contents near grain boundaries of steels after electron irradiation.

The reasons for the addition of each element of the austenitic steel of the present invention will be described in the following.

Because the atomic volume of manganese is larger than those of iron, nickel and chromium, manganese increases the average atomic volume of the matrix. Therefore, addition of the manganese increases the average atomic volume of matrix and prevents movement of chromium away from grain boundaries due to corpuscular beam irradiation. Although manganese serves to stabilize austenite structure like nickel, it should not be added excessively, because excessive addition results in worsening of workability. Therefore, the manganese content selected is from 5 to 25% as a range which poses no problem with workability. The manganese content is preferably from 7 to 20% and is especially preferably from 10 to 16%.

Chromium serves to improve corrosion resistance at grain boundaries. In JIS SUS 304 and 316 steels, irradiation flaws are formed in matrix due to neutron irradiation, and along with diffusion of the flaws chromium diffuses from near the grain boundaries into grains, with the result that chromium depleted layers are formed near the grain boundaries. As a consequence, chromium content near the grain boundaries decreases to below 12%, which is the lower limit of corrosion resistance, and this results in a decrease in intergranular corrosion resistance. Therefore, corrosion resistance at grain boundaries under neutron irradiation can be maintained if chromium content is higher than in the JIS SUS 304 and 316 steels and the average atomic volume of the matrix is adjusted so that the ratio of the average atomic volume of the matrix to the atomic volume of chromium is not more than 1.030 to ensure that chromium content at grain boundaries is virtually not lower than the chromium content of the matrix. To obtain this effect, it is necessary that chromium content of the alloy be from 15 to 26%. However, because chromium makes the structure of austenite unstable, it is desirable to consider the correlation to the manganese which contributes to the stabilization of austenite. Further, it is desirable that the iron content be not less than 50% so as to form an iron-base alloy. It is desirable that total content of chromium and manganese be not more than 45%. Especially, total content of these elements is preferably from 30 to 41%, with chromium content preferably ranging from 20 to 26%.

Nickel serves to stabilize austenite structure in an alloy. It is desirable that the alloy used under neutron irradiation have a stable austenite phase from a standpoint of irradiation embrittlement. Therefore, desirable nickel content is from 10 to 20% so that both the above-mentioned effect of the adjustment of the average atomic volume of the matrix and the effect of stabilization of austenite structure are achieved. The nickel content is especially preferably from 10 to 15%.

Iron is a base element of the alloy of the present invention and its desirable content is from 40 to 70% from the results of use of core materials. The iron content is preferably from 45 to 65% and is especially preferably from 48 to 60%.

Titanium, niobium, tantalum, hafnium, vanadium and zirconium are effective in corrosion resistance under neutron irradiation and irradiation embrittlement resistance. All of these elements have larger atomic radii than iron, nickel, chromium and manganese. In the alloy containing these elements, therefore, the average atomic volume of matrix increases and the VSF-value decreases. As a result, chromium content at grain boundaries does not decrease even after irradiation and the alloy shows excellent corrosion resistance and phase stability.

These elements form especially fine carbides, preventing precipitation of chromium carbides and a decrease in chromium content near grain boundaries. However, in consideration of the limit to dissolution of these elements to the Fe-Ni-Cr-Mn alloy and to ensure good effects of addition of these elements, it is preferable to add one or two or more elements selected from the group consisting of niobium, titanium, tantalum, hafnium, vanadium and zirconium in total amounts of not more than 1.0% and it is especially preferable to add one or two or more elements selected from the above group in total amounts of from 0.1 to 0.6%.

Carbon reacts with chromium upon neutron irradiation and heating to precipitate chromium carbides near grain boundaries, reducing the chromium at the grain boundaries. Because the formation of chromium carbides lowers the corrosion resistance of grain boundaries and initiates stress corrosion cracking, carbon content should be not more than 0.03%. However, presence of no carbon lowers strength and this is, therefore, undesirable. Therefore, the carbon content is preferably not less than 0.003% and is especially preferably from 0.008 to 0.020%.

Phosphorus, silicon and sulfur are contained as incidental elements. Because silicon and aluminum serve also as deoxidizers, they are preferably contained in total amounts of from 0.05 to 1.0%. The especially preferable contents are: 0.05–0.5% silicon, not more than 0.05% phosphorus, and not more than 0.002% sulfur. Phosphorus, silicon and sulfur contained in these ranges do not greatly affect the determination of the ratio of the atomic volume of chromium to the average atomic volume. Further, when the embrittlement by neutron irradiation and the industrial processes are taken into consideration, the phosphorus content is preferably from 0.01 to b 0.03% and the silicon content is preferably from 0.1 to b 0.3%.

The alloy of the present invention may contain either molybdenum or tungsten or both of the elements in a total amount of 3%. These elements can increase strength. Further, they can increase corrosion resistance in high-temperature water. The content is especially preferably from 1 to b 2%.

Furthermore, according to the present invention, nitrogen can be added in amounts of not more than 0.1%. Nitrogen can increase strength.

The austenitic iron-base alloy of the above composition can be produced by melting (vacuum melting is especially preferable), casting, forging and solution treatment. Coarse precipitated phases, such as carbides and sigma-phase, are formed during such producing. The formation of coarse precipitated phases can be prevented by conducting solution treatment at about 1,050° C. followed by cold rolling at reductions of not more than 50% and annealing at temperatures between 950° C. and 1,050° C. at least twice, whereby an improvement in workability can be accomplished.

Further, in the fabrication process of the core structures of a light-water nuclear reactor, heavy-water reactor and nuclear fusion reactor, the formation of coarse precipitated phases can also be suppressed by conducting annealing at temperatures between 950° C. and 1,050° C. at least twice.

Structures and devices in a core of a light-water nuclear reactor, heavy-water reactor and nuclear fusion reactor made of the above-mentioned austenitic iron-base alloy are expected to show better corrosion resistance than those made of the conventional stainless steels JIS SUS 304 and 316 when they are irradiated with not less than $10^{19}$ n/cm$^2$ of neutrons in the core and installed in an environment in contact with pure water.

In the steel of the present invention, the ratio of the atomic volume of chromium to the average atomic volume of the matrix must be between 0.900 and 1.030. If this ratio is not more than 0.900 on one hand, the manganese content of the alloy is too high, with the result that workability, strength and toughness decrease. On the other hand, if this ratio exceeds 1.030, corpuscular beam irradiation reduces the chromium content at the grain boundaries to below the chromium content of the matrix, causing stress corrosion cracking. This ratio should be between 0.900 and 1.030 to prevent the decrease in the chromium content at the grain boundaries by corpuscular beam irradiation. This ratio is especially preferably between 0.95 and 1.000, and at 1.000 or less the chromium content at grain boundaries can be raised by corpuscular beam irradiation. The atomic volume of matrix can be calculated by multiplying the contents (%) by weight of each of the elements chromium, nickel, manganese and iron to the atomic volumes of chromium, nickel, manganese and gamma-iron as matrix respectively and dividing the total by 100. If there are other added elements, they are similarly calculated. Incidentally, carbon and impurity elements, such as phosphorus and sulfur, may be excluded from the calculation because they are contained in trace amounts.

The steel of the present invention preferably has proof stress of 18 kg/mm$^2$ or more, tensile strength of 49 kg/mm$^2$ or more, elongation of 40% or more, reduction of area of 60% or more, and Vickers hardness of 200 or less at room temperature, and especially preferably has proof stress of from 25 to 50 kg/mm$^2$, tensile strength of from 55 to 80 kg/mm$^2$, and elongation of from 40 to 75%.

EXAMPLE 1

An examination was made into the chromium precipitation behavior by neutron irradiation of a steel with whole austenite phase which contains, by weight, 0.020% carbon, 15.0% manganese, 10.2% nickel, 23.1% chromium, 0.45% silicon and the balance essentially iron. After vacuum melting, this steel was hot forged and then hot rolled, and was subjected to solution treatment at 1,050° C. After that, cold rolling to a thickness of 0.25 mm and annealing were repeated and finally, solution treatment was conducted by heating to 1,050° C. for 15 min.

The ratio of the atomic volume of chromium to the average atomic volume of the matrix (volume size factor: VSF) of this alloy determined by the following calculation is 0.966.

The atomic radius of gamma-iron, chromium, nickel and manganese is 1.26 A, 1.29 A, 1.25 A and 1.49 A, respectively. The volume of one atom of each of these elements was determined, and each volume was multiplied by the content of each element (% by weight) to obtain the sum total, which was divided by 100. The quotient thus obtained was regarded as the average atomic volume of the matrix. Nickel was added in the range of 10 to 20% and the nickel amount added was such that it was immediately above 0% ferrite shown in Schaeffler diagram of nickel equivalent and chromium equivalent so as to form whole austenite phase.

Carbon, silicon, phosphorus and sulfur were not taken into account because of their trace amounts.

The VSF-value of the conventional steel JIS SUS 304 is 1.057.

FIG. 1 is a graph showing chromium content near grain boundaries after the above alloy was irradiated with electrons.

Irradiation conditions were such that the alloy was irradiated with 1 MeV electrons at an irradiation temperature of 500° C. in an amount corresponding to $5\times 10^{22}$ n/cm² in terms of neutron irradiation, and neutron irradiation was simulated.

After electron irradiation, the chromium content at the grain boundaries was analyzed using an energy dispersion type X-ray analyzer (EDX). The results of irradiation of a commercial steel (JIS SUS 304 stainless steel) were shown for a comparison. As shown in the figure, the conventional steel shows about 3% chromium deficiency (or depletion) from 18% to 15% of matrix at grain boundaries. In the Fe-15%Mr-10%Ni-23%Cr alloy of the present invention, chromium segregation corresponding to about 0.8% higher than chromium content of matrix occurred near grain boundaries. This is because this alloy has a low VSF-value of 0.966, with the result that chromium segregated at the grain boundaries in association with the formation of irradiation defects and diffusion.

Incidentally, the chemical composition of JIS SUS 304 is that of No. 11 in Table 1 which will be described later.

The results of research into layers deficient in chromium at the grain boundaries due to thermal sensitization by high-temperature water reveal that the critical condition under which intergranular corrosion does not occur is, by weight ratio, (chromium content at grain boundaries)/(chromium content of matrix)>0.6

Since this ratio exceeds 1.0 in the Fe-15%Mn-10%Ni23%Cr of the present invention, it is expected that intergranular corrosion does not occur due to irradiation. At VSF of not more than 1.000, therefore, it might be thought that layers deficient in chromium are not formed and that stress corrosion cracking in high-temperature water does not occur. In the conventional steel JIS SUS 304, however, this ratio becomes not more than 0.6 after long hours of service, and as a result intergranular corrosion occurs.

The following experiments were conducted on the various alloys (% by weight) given in Table 1. The VSF-values in the table were obtained in the same procedure as described above.

Further, the commercial stainless steels JIS SUS 304 (No. 11 and No. 12) and JIS SUS 316 (No. 13) were used for a comparison. The properties of these specimens were investigated according to the following test methods. Each specimen was prepared in the same manner as mentioned above.

(1) Behavior of chromium segregation near boundaries by the electron irradiation was described above.
(2) After solution treatment at 1,050° C. for 30 min, the slow strain rate test (SSRT) was conducted at a low strain rate of $3\times 10^{-7}$/sec in the water of a boiling water type light-water reactor at 288° C. and 75 atm.
(3) Neutron irradiation was simulated by irradiation with $1\times 10^{17}$ ions/cm² of 20 MeV alpha-rays at room temperature and the SSRT test was conducted under the same conditions as (2) above.
(4) Measurement of the stability of the austenite phase.

TABLE 1

| No. | Mn | Ni | Cr | C | Si | Mo | Others | Fe | VSF |
|---|---|---|---|---|---|---|---|---|---|
| Steels of the present invention |
| 1 | 15.0 | 9.95 | 23.0 | 0.013 | 0.46 | — | — | Balance | 0.966 |
| 2 | 14.8 | 10.1 | 20.3 | 0.013 | 0.44 | — | — | " | 0.969 |
| 3 | 15.3 | 10.8 | 25.8 | 0.012 | 0.42 | — | — | " | 0.963 |
| 4 | 9.94 | 12.8 | 20.4 | 0.013 | 0.45 | — | — | " | 0.998 |
| 5 | 10.1 | 13.1 | 22.8 | 0.013 | 0.45 | — | — | " | 0.995 |
| 6 | 10.3 | 13.0 | 25.4 | 0.014 | 0.45 | — | — | " | 0.992 |
| 7 | 7.93 | 12.1 | 26.0 | 0.011 | 0.45 | — | — | " | 1.006 |
| 8 | 8.10 | 15.2 | 26.3 | 0.013 | 0.42 | — | — | " | 1.005 |
| 9 | 5.10 | 17.9 | 25.8 | 0.014 | 0.36 | — | — | " | 1.025 |
| 10 | 4.90 | 14.8 | 26.1 | 0.011 | 0.28 | — | — | " | 1.026 |
| Conventional steel |
| 11 | 0.9 | 8.2 | 18.1 | 0.06 | 0.47 | — | — | " | 1.057 |
| 12 | 0.9 | 9.9 | 18.3 | 0.020 | 0.51 | — | — | " | 1.056 |
| 13 | 0.9 | 12.4 | 16.9 | 0.021 | 0.43 | 2.20 | — | " | 1.059 |
| Steel of the present invention |
| 14 | 14.9 | 10.2 | 22.3 | 0.015 | 0.45 | — | Ti 0.30 | Balance | 0.965 |
| 15 | 10.2 | 13.1 | 23.0 | 0.020 | 0.46 | — | Ti 0.35 | " | 0.990 |
| 16 | 10.3 | 13.5 | 22.5 | 0.013 | 0.47 | — | Nb 0.31 | " | 0.991 |
| 17 | 10.1 | 13.2 | 21.9 | 0.014 | 0.46 | — | Zr 0.29 | " | 0.989 |
| 18 | 10.0 | 13.3 | 22.0 | 0.014 | 0.47 | — | V 0.30 | " | 0.990 |
| 19 | 10.2 | 13.2 | 22.1 | 0.015 | 0.46 | — | Hf 0.31 | " | 0.990 |

In the test (1) above, it is possible to investigate the formation of layers deficient in chromium after irradiation with a large neutron does through a structural change, which is local, however. The test (2) is suited to the evaluation of corrosion resistance in an environment of the core of a light-water reactor, and the test (3) is a test in which the effect of neutron irradiation is added to the function of the test (2). To evaluate corrosion resistance, the fracture after the SSRT was observed under a scanning type electron microscope and the intergranular fractured surface rate was calculated. Those with a lower fractured surface rate than the stainless steel JIS SUS 304 were judged to be excellent in corrosion resistance. In the test (4) above, the stability of the austenite phase was investigated using a ferrite indicator, and a comparison was made with JIS SUS 304.

Table 2 shows the results of the tests (1) to (4) conducted on the steels of the compositions given in Table 1.

TABLE 2

| Sample No. | Chromium content at grain boundaries | Corrosion resistance before irradiation | Corrosion resistance after irradiation | Phase stability |
|---|---|---|---|---|
| Steel of the present invention |
| 1 | + | ◯ | ◉ | ◉ |
| 2 | + | ◯ | ◉ | ◉ |
| 3 | + | ◯ | ◉ | ◉ |
| 4 | + | ◯ | ◉ | ◉ |
| 5 | + | ◯ | ◉ | ◉ |

TABLE 2-continued

| Sample No. | Chromium content at grain boundaries | Corrosion resistance before irradiation | Corrosion resistance after irradiation | Phase stability |
|---|---|---|---|---|
| 6 | + | ○ | ◎ | ○ |
| 7 | ○ | ○ | ○ | ◎ |
| 8 | ○ | ○ | ○ | ◎ |
| 9 | ○ | ○ | ○ | ◎ |
| 10 | ○ | ○ | ○ | ○ |
| Conventional steel | | | | |
| 11 | − | ○ | ○ | ○ |
| 12 | − | ○ | ○ | ○ |
| 13 | − | ◎ | ○ | ◎ |
| Steel of the present invention | | | | |
| 14 | + | ○ | ◎ | ◎ |
| 15 | + | ○ | ○ | ◎ |
| 16 | + | ○ | ◎ | ◎ |
| 17 | + | ○ | ○ | ◎ |
| 18 | + | ○ | ○ | ◎ |
| 19 | + | ○ | ○ | ◎ |

Legend:
+ Higher than the matrix
○ Little change
− Lower than the matrix
○ Same as JIS SUS 304 steel
◎ Better than JIS SUS 304 steel As shown in Table 1, all of the steels of the present invention No. 1 to No. 10 have low VSF-values of not more than 1.030 and all of the conventional steels have high values of not less than 1.056. Incidentally, carbon, silicon and other impurities are excluded from the calculation of the VSF-value.

Because in the steels of the present invention No. 1 to No. 6 the chromium content at grain boundaries increases about 0.5% by weight, the VSF-value is not more than 1.000 although the chromium content at the grain boundaries increases after neutron irradiation. In the steels No. 7 to No. 10, the changes in the chromium are small and resistance to stress corrosion cracking under neutron irradiation can be expected. Therefore, to ensure a positive increase in the chromium content at the grain boundaries, it is desirable that the VSF-value be not more than 1.000. In all of the conventional steels with VSF of not less than 1.05, the chromium content at grain boundaries decreases about 3% and it might be thought that stress corrosion cracking occurs.

In the corrosion test before irradiation, all of the steels of the present invention showed good corrosion resistance as good as that of the conventional stainless steel JIS SUS 304. In the corrosion test after irradiation, however, the steels of the present invention, especially No. 1 to No. 6 showed improved corrosion resistance compared with those tested before irradiation. In other words, in the test (3) above, the fractured surfaces of samples after the test were observed In the steels of the present invention No. 1 to No. 6, the area fraction of intergranular fracture was almost 0%. The area fraction of intergranular fracture of the steels No. 7 to No. 10 was from 10 to 15%, and that of the conventional steels No. 11 to No. 13 was about 30%. It might be thought that the corrosion resistance of grain boundaries improved compared with the test before irradiation because the chromium near grain boundaries was concentrated due to alpha-ray irradiation. The same effect can be expected from neutron irradiation.

In the phase stability test, the steels of the present invention show the same stability of austenite phase as the conventional steels such as JIS SUS 304 and 316 stainless steels, and irradiation embrittlement and mechanical properties of the steels of the present invention are expected to be equal or superior to those of the conventional steels.

Figure 2:
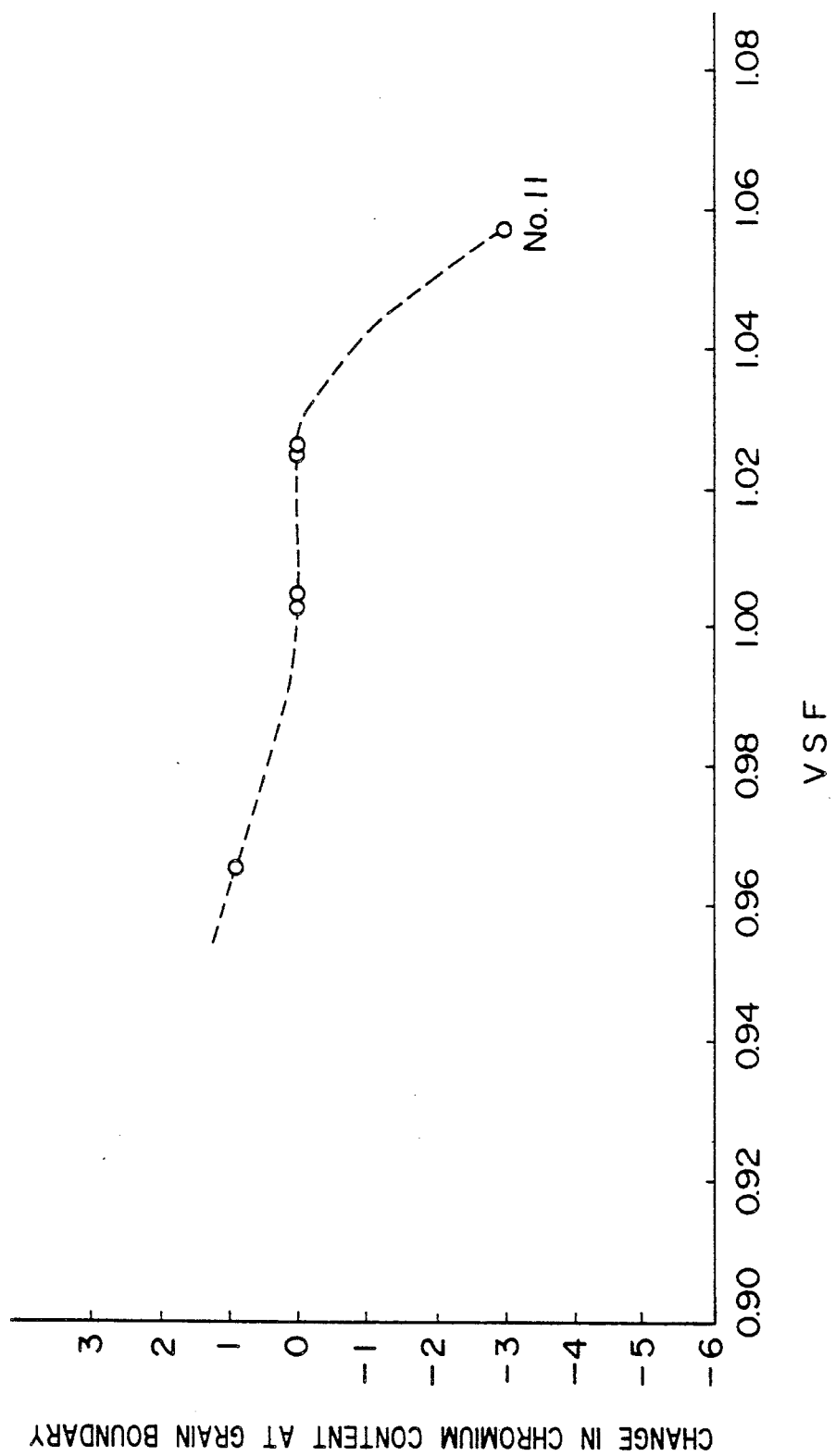
FIG. 2 is a graph showing the relationship between the volume size factor (VSF) and change in chromium content at grain boundaries.

FIG. 2 is a diagram showing the relationship between the VSF-values of various alloys and the change in the chromium content at the grain boundaries after irradiation with electron beams or alpha-rays. As shown in the figure, the chromium content at the grain boundaries decreases when the VSF-value exceeds 1.030; it is apparent that the chromium content decreases when the alloy is irradiated with corpuscular beams of larger exposure. Therefore, alloys used in high-temperature water may develop stress corrosion cracking. However, the decrease in the chromium content is small at VSF-values of not more than 1.030 and the chromium content at the grain boundaries is higher than that of the matrix at VSF-values of not more than 1.000; therefore, it is apparent that stress corrosion cracking does not occur.

The steels of the present invention showed proof stress of 18 kg/mm$^2$ or more, tensile strength of 49 kg/mm$^2$ or more, elongation of 40% or more, reduction of area of 60% or more, and Vickers hardness of 200 or less at room temperature.

EXAMPLE 2

Figure 3:
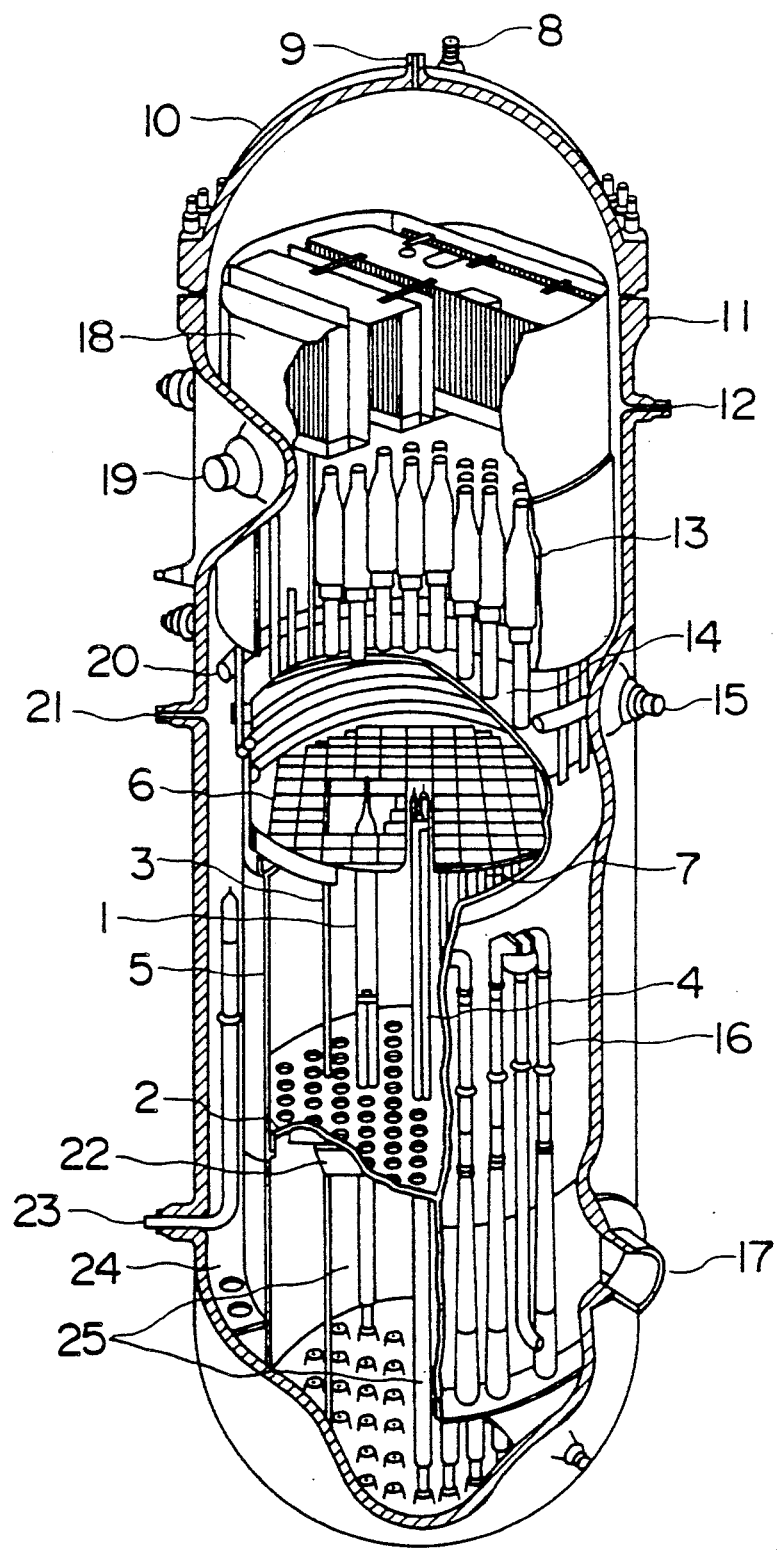
FIG. 3 is a partially cutaway perspective view of a core of a boiling water reactor.
Figure 4:
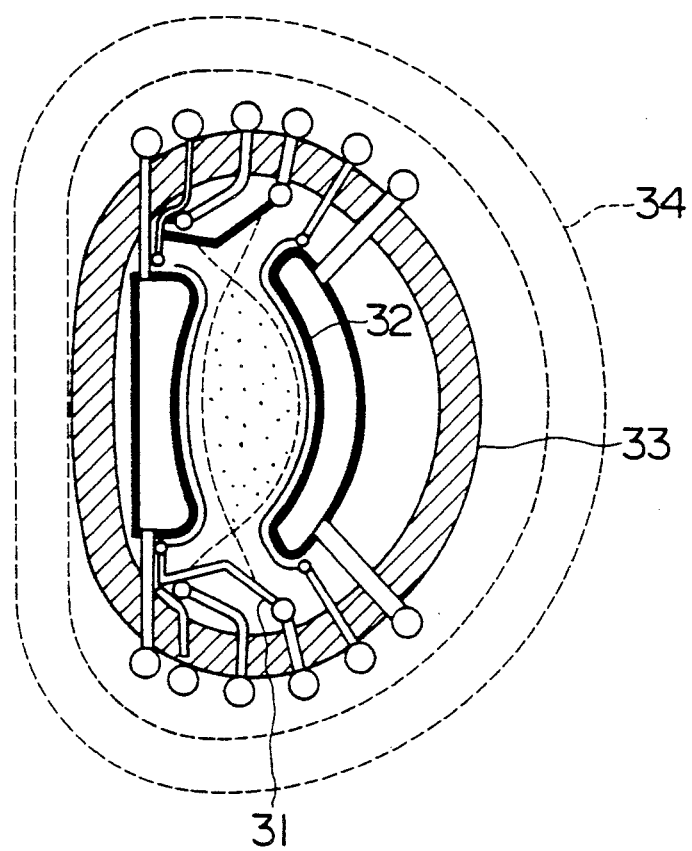
FIG. 4 is a sectional view of a nuclear fusion reactor.

FIG. 3 is a schematic sectional perspective view of the core of a boiling water reactor (BWR). In the figure, the numeral 1 represents a neutron source pipe, the numeral 2 a core support plate, the numeral 3 a neutron counter, the numeral 4 a control rod, the numeral 5 a shroud, and the numeral 6 an upper lattice plate. These structures and devices compose the core of the light-water reactor; they are subjected to a large neutron irradiation and are used in high-temperature, high-pressure water at 288° C. and 7 MPa. The chromium content at the grain boundaries increases and corrosion resistance is improved if these structures and devices are made of the austenitic iron-base alloy of the present invention. The same effect can be expected if parts which are used in these structures and devices and are parts other than those shown in FIG. 2 are made of the alloy of the present invention. Further, the same effect can be expected if the alloy of the present invention is used in the structures and devices of the core of water-cooled reactors other than the boiling water type.

If the above-mentioned neutron source pipe 1, neutron counter 3, control-rod insertion pipe, and channel box and fuel clad pipe of fuel assembly 7 are made of the alloys No. 1 to No. 6 with VSF of not more than 1.000 shown in Example 1, they provide excellent cracking to stress corrosion cracking by neutron irradiation. These members are obtained from ingots by hot working and the same repetition of solution treatment and succeeding cold working as mentioned above.

Further, the core support plate 2, shroud 5, and upper lattice plate 6 are obtained from alloy ingots of No. 1 to No. 6 with VSF of not more than 1.000 by hot working and solution treatment in the same manner as mentioned above.

Furthermore, the core of a reactor are is composed of the following devices or members, and the alloys of the present invention can also be used in these structures of the inside of the reactor: 8: top-mirror spray nozzle, 9: bent nozzle, 10: pressure vessel cover, 11: pressure vessel flange, 12: measuring nozzle, 13: steam separator, 14: shroud head, 15: feedwater inlet nozzle, 16: jet pump, 17: recirculating water outlet nozzle, 18: steam drier, 19: steam outlet nozzle, 20: feedwater sprayer, 21: core spray nozzle, 22: lower core lattice, 23: recirculating water inlet nozzle, 24: baffle plate, 25: control-rod guide pipe.

Further, the alloys of the present invention can also be applied to advanced boiling water reactors (ABWRs) provided with internal pumps in the reactors and pressurized water reactors (PWRs). In the inside of ABWR, internal pumps are installed in place of the above-mentioned jet pumps 16 of BWR and the construction of the inside of ABWR is similar to that of BWR in other respects. Therefore, like the above products applied to BWR, the alloys of the present invention are applied to the devices and structures of the inside of this ABWR in the same manner as mentioned above. High safety is obtained by using the alloys of the present invention.

EXAMPLE 3

FIG. 3 is a schematic sectional view of a TOKAMAK nuclear fusion reactor. In the figure, the numeral 31 represents a divertor, the numeral 32 the first wall and cooling panel, and the numeral 33 a vacuum vessel. These structures and devices compose the core of the TOKAMAK fusion reactor. They are so designed as to be irradiated with large amounts of neutrons and various corpuscular beams leaking from plasma and to be in contact with the cooling water. If these structures and devices are made of the austenitic iron-base alloys of the present invention, the decrease in the chromium content at grain boundaries under irradiation does not occur and, conversely, the chromium content at grain boundaries increases, whereby corrosion resistance can be improved.

The divertor 31, the first wall 32 and vacuum vessel 33 are composed of water-cooled components of the alloys of the present invention. The divertor 31 and the first wall 32 have a construction in which blocks of low atomic numbers (for example, SiC, $Si_3N_4$, AlN, $Al_2O_3$ and ceramics) are mechanically or metallurgically joined to the cooled metal surfaces. The alloys of the present invention are also applied to them, and they are made of plate or pipe of the above-mentioned alloys, especially, No. 1 to No. 6 with VSF of not more than 1.000.

The nuclear fusion equipment is provided with a toroidal coil and an evacuation device (not illustrated) is an addition to a toroidal coil 34 (not illustrated). There are also an open magnetic field type and an inertial confinement laser heating type as other types of nuclear fusion equipment, and the alloys of the present invention can also be applied to these types and high reliability can be obtained.

As is apparent from the above, according to the present invention, it is possible to improve the corrosion resistance of structures and devices used in an environment which is irradiated with not less than $10^{19}$ n/cm² of fast neutrons or equivalent corpuscular beams and is in contact with high-temperature water or high-temperature, high-pressure water. If the austenitic steel of the present invention is used in the structures and devices inside a nuclear reactor as well as in the vacuum vessel of a nuclear fusion reactor and the structures and devices within the vacuum vessel, high reliability can be obtained and the service conditions can be improved.

What is claimed is:

1. An austenitic steel excellent in resistance to neutron irradiation embrittlement and used in high-temperature and high-pressure pure water under neutron irradiation which contains, by weight, not more than 0.03% carbon, not more than 1% silicon, 5 to 25% manganese, 15 to 26% chromium, 10 to 20% nickel, the ratio of atomic volume of chromium to the average atomic volume of matrix of said steel being from 0.900 to 1.030, and balance essentially iron.

2. An austenitic steel excellent in resistance to neutron irradiation embrittlement and used in high-temperature and high-pressure pure water under neutron irradiation which contains, by weight, not more than 0.03% carbon, not more than 1% silicon, 7 to 25% manganese, 15 to 26% chromium, 10 to 20% nickel, and balance essentially iron, and wherein the ratio of atomic volume of chromium to the average atomic volume of matrix of said steel is from 0.900 to 1.030.

3. An austenitic steel excellent in resistance to neutron irradiation embrittlement and used in high-temperature and high-pressure pure water under neutron irradiation which contains not more than 0.30% by weight carbon, not more than 1% silicon, 5 to 25% manganese, 15 to 26% chromium, 10 to 20% nickel, and balance essentially iron such that the steel has whole austenite microstructure, said steel containing the above manganese, nickel and chromium so that chromium content at grain boundaries is virtually not less than chromium content of matrix when said steel is irradiated at 500° C. with 1 MeV electron beams in an amount corresponding to $5 \times 10^{22}$ n/cm² in terms of quantity of neutron irradiation, and wherein the ratio of atomic volume of chromium to the average atomic volume of matrix of said steel is from 0.900 to 1.030.

4. An austenitic steel excellent in resistance to neutron irradiation embrittlement and used in high-temperature and high-pressure pure water under neutron irradiation which contains, by weight, not more than 0.03% carbon, not more than 1% silicon, 5 to 25% manganese, 15 to 26% chromium, 10 to 20% nickel, at least one element selected from the group consisting of niobium, titanium, zirconium, tantalum and vanadium in total amounts of not more than 1.0%, and balance essentially iron, and wherein the ratio of atomic volume of chromium to the average atomic volume of matrix of said steel is from 0.900 to 1.030.

5. An austenitic steel excellent in resistance to neutron irradiation embrittlement and used in high-temperature and high-pressure pure water under neutron irradiation which contains, by weight, not more than 0.30% carbon, not more than 1% silicon, 7 to 25% manganese, 15 to 26% chromium, 10 to 20% nickel, at least one element selected from the group consisting of niobium, titanium, zirconium, tantalum, hafnium and vanadium in total amounts of not more than 1.0%, and balance essentially iron, and wherein the ratio of atomic volume of chromium to the average atomic volume of matrix of said steel is from 0.900 to 1.030.

6. An austenitic steel excellent in resistance to neutron irradiation embrittlement and used in irradiation which contains not more than 0.03% by weight carbon, not more than 1% silicon, 5 to 25% manganese, 15 to 26% chromium, 10 to 20% nickel, and balance essentially iron, and wherein the ratio of atomic volume of chromium to the average atomic volume of matrix of said steel if from 0.900 to 1.030, such that said steel has whole austenite microstructure, an area ratio of intergranular fracture of said steel which is not more than 15% when said steel is irradiated at 500° C. with 1 MeV electron beams in an amount corresponding to $5 \times 10^{22}$ n/cm² in terms of quantity of neutron irradiation, and is subjected to tensile test at room temperature at a strain rate of $3 \times 10^{-7}$/sec.

7. A nuclear reactor having a pressure vessel with a neutron source pipe, a core support plate, a neutron counter, a control-rod insertion pipe, a shroud, an upper lattice plate, and a clad pipe and a channel box for a fuel assembly which are used in high-temperature and high-pressure pure water under neutron irradiation, at least one of the above components of said nuclear reactor being made of a steel which contains, by weight, not more than 0.03% carbon, not more than 1% silicon, 5 to 25% manganese, 15 to 26% chromium, 10 to 20% nickel, balance essentially iron, and has whole austenite microstructure, and wherein the ratio of atomic volume of chromium to the average atomic volume of matrix of said steel is from 0.900 to 1.030.

8. The nuclear reactor as claimed in claim 7, wherein said steel contains, besides the above-mentioned alloying elements, at least one element selected from the group consisting of niobium, titanium, zirconium, tantalum, hafnium and vanadium in total amounts of not more than 1.0% by weight and has whole austenite microstructure.

9. Components composing the inside of a nuclear reactor which includes a neutron source pipe, a core support plate, a neutron counter, a control-rod insertion pipe, a shroud, an upper lattice plate, and a clad pipe and a channel box for a fuel assembly which are used in high-temperature and high-pressure pure water under neutron irradiation, at least one of said components being made of a steel which contains, by weight, not more than 0.03% carbon, not more than 1% silicon, 5 to 25% manganese, 15 to 26% chromium, 10 to 20% nickel, balance essentially iron, and has whole austenite microstructure, and wherein the ratio of atomic volume of chromium to the average atomic volume of matrix of said steel os 0.900 to 1.030.

10. The components composing the inside of a nuclear reactor as claimed in claim 9, wherein said steel further contains, at least one element selected from the group consisting of niobium, titanium, zirconium, tantalum, hafnium and vanadium in total amounts of not more than 1.0% by weight and has whole austenite microstructure.

11. A nuclear fusion reactor comprising a diverter provided with ceramic tiles on plasma side thereof and having a water-cooled construction and a first wall provided with ceramic tiles on plasma side thereof and having a water-cooled construction in a vacuum vessel having a water-cooled construction, at least one of said diverter and said first wall of said nuclear fusion reactor being made of a steel which contains, by weight, not more than 0.30% carbon, not more than 1% silicon, 5 to 25% manganese, 15 to 26% chromium, 10 to 20% nickel, balance essentially iron, and has whole austenite microstructure, and wherein the ratio of atomic volume of chromium to the average atomic volume of matrix of said steel is from 0.900 to 1.030, the diverter and the first wall being used in high-temperature and high-pressure pure water under neutron irradiation.

12. The nuclear fusion reactor as claimed in claim 11, wherein said steel further contains, at least one element selected from the group consisting of niobium, titanium, zirconium, tantalum, hafnium and vanadium in total amounts of not more than 1.0% by weight and has whole austenite microstructure.

13. Components composing the inside of a nuclear fusion reactor which includes a vacuum vessel having a water-cooled construction, a diverter provided with ceramic tiles and having a water-cooled construction, and a first wall provided with ceramic tiles and having a water-cooled construction, at least one of said diverter and said first wall being made of a steel which contains, by weight, not more than 0.30% carbon, not more than 1% silicon, 5 to 25% manganese, 15 to 26% chromium, 10 to 20% nickel, balance essentially iron, and has whole austenite microstructure, and wherein the ratio of atomic volume of chromium to the average atomic volume of matrix of said steel is from 0.900 to 1.030, the diverter and the first wall being used in high-temperature and high-pressure pure water under neutron irradiation.

14. The components composing the inside of a nuclear fusion reactor as claimed in claim 13, wherein said steel further contains, at least one element selected from the group consisting of niobium, titanium, zirconium, tantalum, hafnium and vanadium in total amounts of not more than 1.0% by weight and has whole austenite microstructure.

* * * * *